United States Patent [19]

Bertellotti

[11] 3,926,490

[45] Dec. 16, 1975

[54] LOCKING BAR FOR PRINTED WIRING CARD FILE

[75] Inventor: Ansano Bertellotti, Addison, Ill.

[73] Assignee: GTE Automatic Electric Laboratories Incorporated, Northlake, Ill.

[22] Filed: Apr. 18, 1973

[21] Appl. No.: 352,156

[52] U.S. Cl. .............................. 312/319; 339/17 M

[51] Int. Cl.$^2$ .............................. H05K 5/00

[58] Field of Search ........... 312/215, 216, 319, 320, 312/333; 211/41, 8; 339/75 MP; 317/101

[56] References Cited

UNITED STATES PATENTS

| | | | |
|---|---|---|---|
| 549,212 | 11/1895 | Roberts | 312/216 UX |
| 630,505 | 8/1899 | Hicks | 312/216 X |
| 1,023,297 | 4/1912 | Chambers | 312/216 X |
| 1,349,527 | 8/1920 | Owen | 312/216 |
| 1,450,084 | 3/1923 | Hull | 211/8 |
| 1,866,180 | 7/1932 | Swift | 312/333 X |
| 2,005,099 | 6/1935 | McLeod | 211/41 |
| 2,676,866 | 4/1954 | Woodin | 312/333 |
| 2,958,014 | 10/1960 | Blain | 339/75 MP |
| 2,987,358 | 1/1961 | Roberts | 312/216 |
| 3,360,689 | 12/1967 | Haury | 339/17 LM |
| 3,371,974 | 3/1968 | Vermeersch | 312/221 X |
| 3,437,365 | 4/1969 | Zadanoff et al. | 312/333 X |
| 3,476,258 | 11/1969 | Dorsett | 211/41 |
| 3,521,939 | 7/1970 | Fall et al. | 312/215 X |
| 3,644,868 | 2/1972 | Nevala | 339/17 LM |
| 3,760,952 | 9/1973 | White | 312/216 |

*Primary Examiner*—Richard E. Moore

[57] ABSTRACT

A locking bar arrangement for positively retaining a plurality of printed wiring cards in their inserted position in a printed wiring card file. A locking bar is positioned transversely of the wiring cards across the front of the file and is retained in a position in a first embodiment by a cammed lever and linkage and in a second embodiment by spring fingers.

5 Claims, 2 Drawing Figures

LOCKING BAR FOR PRINTED WIRING CARD FILE

BACKGROUND OF THE INVENTION

1. Field of the Invention

The present invention relates generally to the field of printed wiring card files and more particularly to a new and novel apparatus for locking a plurality of printed wiring cards in such card files.

2. Description of the Prior Art

Prior to the present invention a variety of devices for locking printed wiring cards in their inserted position in a printed wiring card file have been devised. With each such device it has been necessary that all or a portion of the locking mechanism be attached to the individual printed wiring cards to be filed. Exemplary of this prior art are U.S. Pat. Nos. 2,993,187, 3,197,731, 3,245,546, 3,311,863, 3,451,034 and 3,476,258.

With each of these prior art approaches the printed wiring card manufacture is complicated by the necessity that the locking mechanism be individually affixed to each wiring card. A further shortcoming arises in that the printed wiring card itself becomes a structural part of the locking mechanism.

OBJECTS AND SUMMARY OF THE INVENTION

From the preceding discussion it will be understood that among the various objectives of the present invention are included:

the provision of a new and improved locking arrangement for retaining printed wiring cards in a wiring card file, the provision of apparatus of the above-described character which accommodates a plurality of printed wiring cards, and the provision of apparatus of the above-described character which is self-aligning.

These and other objectives of the present invention are efficiently met by providing a locking bar disposed transversely of a horizontal array of printed wiring cards in a wiring card file. The locking bar is retained under compression against the outer edges of the wiring cards in a first embodiment by a lever mechanism which is mounted to the card file. In a second embodiment the locking bar is retained by a spring finger arrangement mounted on the card file.

The foregoing as well as other objects, features and advantages of the present invention will be more clearly understood from the following detailed description taken in conjunction with the appended drawings.

DESCRIPTION OF PREFERRED EMBODIMENT

Figure 1:
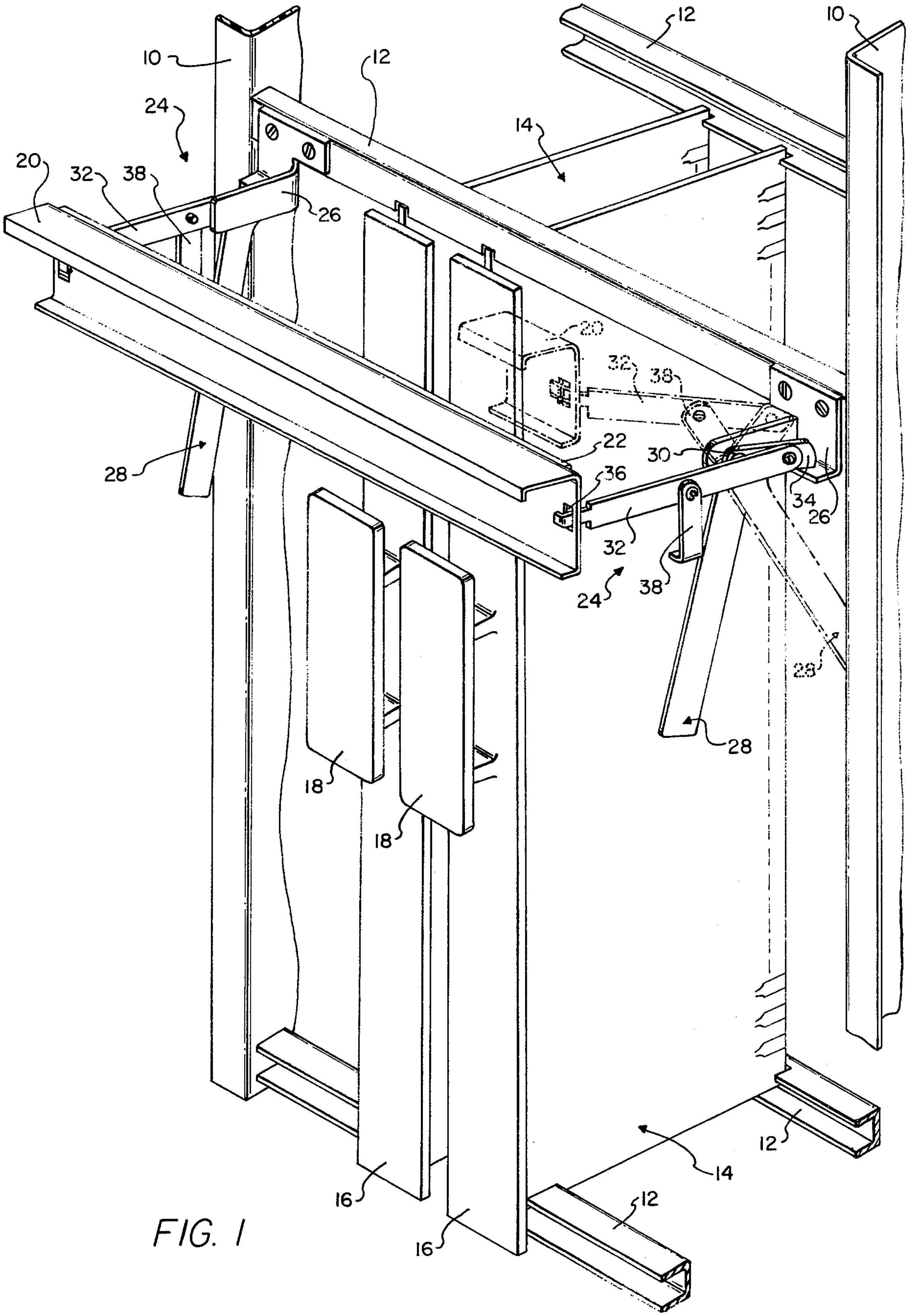
FIG. 1 is a partial elevation view of a self-storing locking bar arrangement using a cammed lever bar mounting.

With reference now to FIG. 1 there is illustrated a self-storing locking bar for printed wiring card files constructed in accordance with the principles of the present invention. The invention is intended for use with the conventional printed wiring card file including upright supporting columns 10 and file shelves 12 between which printed wiring cards 14 are inserted in vertically spaced horizontal arrays. Typically the printed wiring cards 14 will be provided with a handle portion 16 at their outer edges and may further have a heat dissipating sink 18. The wiring cards and card file structure are shown only schematically since they are well known to those skilled in the art.

The locking bar arrangement of the present invention comprises a locking bar 20 formed of any suitably rigid material. In practice a 1¼ inch wide channel of 1/16 inch steel has been found suitable in applications of about 23 inches in length. The locking bar 20 is disposed transversely of the horizontal array of printed wiring cards 14 with its flat surface adjacent thereto. It is preferred in the practice of the invention that the locking bar 20 be provided with a strip of resilient material 22 such as sponge rubber. The resilient strip 22 permits the application of inward compression to the wiring cards 14 and also serves to accommodate a certain amount of inconsistency in the depth of the wiring card frames.

The locking bar 20 is mounted at each end to a cammed lever and linkage mechanism 24 which is in turn mounted to a bracket 26 attached to the wiring card file column 10 or shelf 12. An L-shaped locking lever 28 is pivotally mounted at its heel 30 to the mounting bracket 26. A tie strap 32 is pivotally mounted to the toe 34 of the locking lever 28 and extends outwardly being attached at its outer end to the locking bar 20. In practice the locking bar 20 may be simply provided with an aperture 36 at each end through which the outer end of the tie strap 32 may be passed and then bent over such as to be free floating. The tie strap 32 may also be provided with a pivotally mounted stop 38.

In the view of FIG. 1 the locking bar 20 and the cammed lever and linkage mechanism 24 are shown in the locked position. These elements are further partially illustrated in phantom in the open position. In the locked position the locking lever 28 is pulled outwardly such that the tie strap 32 and thus the locking bar is drawn inwardly compressing the resilient strip 22 against the front edge of each wiring card 14 in the horizontal array. To remove a printed wiring card from the array the locking lever 28 is pushed inwardly thus driving the tie strap 32 and locking bar 20 outwardly and relieving the compression on the wiring cards. Due to the pivotal mounting of the tie strap 32 to the toe of the locking lever 28 the locking bar 20 may be raised sufficiently to allow withdrawal of the cards. Further since the stop 38 is also pivotally mounted to the tie strap 32 it may be rotated to rest against the locking lever 28 and hold the locking bar in the withdrawn position during servicing of the wiring cards 14. In this embodiment the locking bar 20 is thus self-storing.

Figure 2:
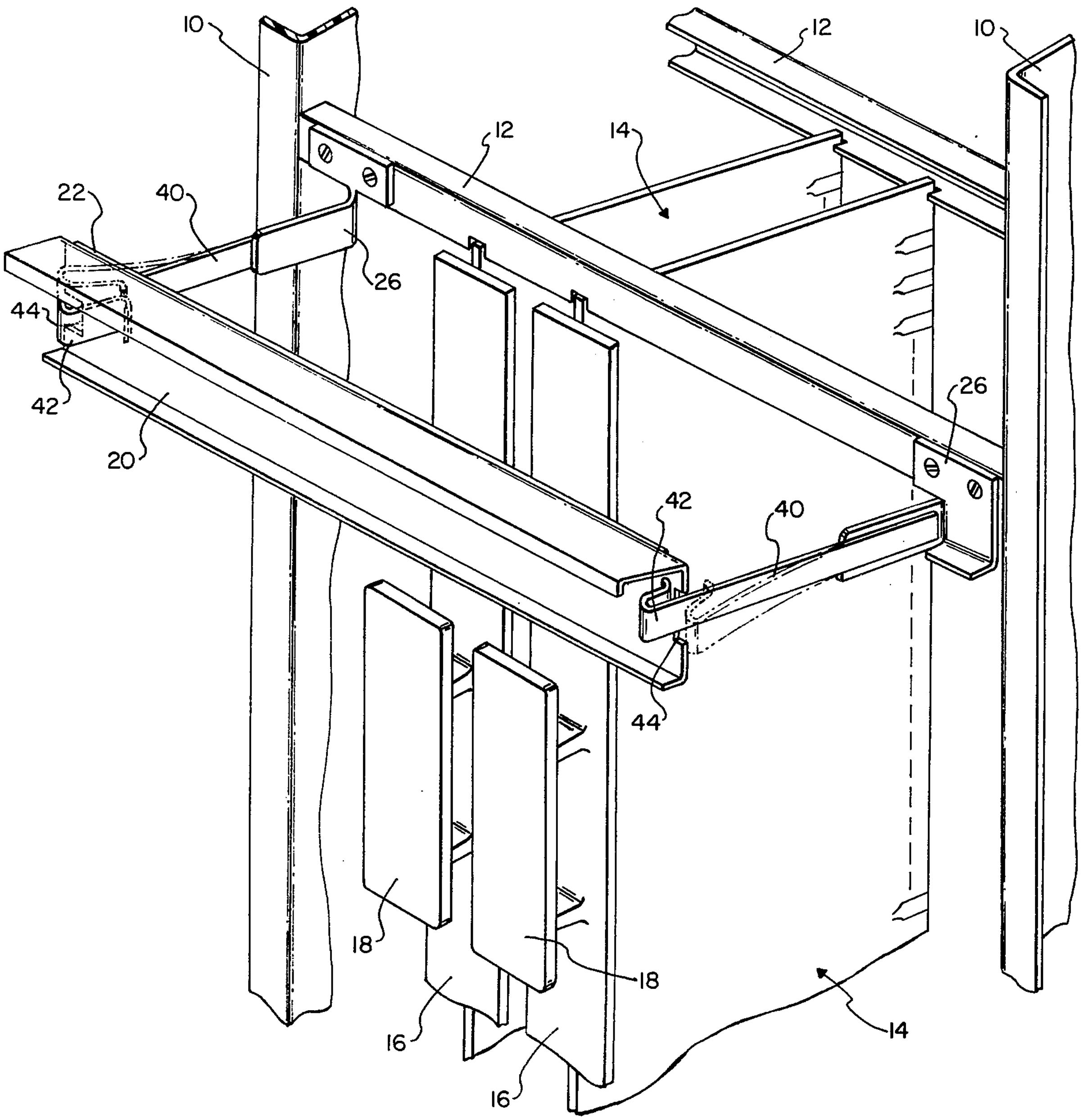
FIG. 2 is a partial elevation view of a spring finger mounted locking bar arrangement.

FIG. 2 is a partial elevation view of a simplified embodiment of the present invention wherein elements common to those shown in FIG. 1 are identified by like reference characters. In this embodiment the locking bar 20 is retained in compression against the printed wiring cards 14 by flat spring finger elements 40 extending outwardly from the mounting brackets 26. The spring fingers 40 due to their flat configuration provide a transversely inward force to retain the locking bar 20 and are shaped at their outer ends 42 such as to provide inward compression of the locking bar 20 against the front edges of the printed wiring cards 14. With this embodiment of the invention the locking bar 20 is preferably provided with notches 44 at each end which are adapted to receive the flat portion of the spring fingers 40 and thus aid in the vertical alignment of the assembly.

To remove the locking bar 20 for servicing of the printed wiring cards 14, it is only necessary to deflect the spring fingers 40 transversely outward sufficiently to disengage the locking bar. The spring fingers 40 are illustrated in phantom for this condition.

From the foregoing discussion it will be understood that the applicant has provided a new and novel locking bar for printed wiring card files whereby the objectives set forth hereinabove are efficiently achieved. Since certain changes in the above-described construction will occur to those skilled in the art without departure from the scope of the invention it is intended that all matter set forth in the preceding description or shown in the appended drawings shall be interpreted as illustrative and not in a limiting sense.

Having described what is new and novel and desired to secure by Letters Patent, what is claimed is:

1. Apparatus for retaining horizontal arrays of printed wiring cards in a printed wiring card file, said apparatus comprising:

a locking bar disposed transversely across said printed wiring card array, said locking bar having disposed on the card engaging surface a layer of resilient material;

retaining means affixed to said printed wiring card file and adapted to engage each end of said locking bar; whereby said locking bar is held under compression against the edges of said printed wiring cards when said retaining means is engaged.

2. Apparatus as recited in claim 1 wherein said retaining means comprises first and second spring finger elements extending outwardly from said wiring card file, engaging the opposite ends of said locking bar, and being biased such as to provide inward compression of said locking bar against said printed wiring cards.

3. Apparatus as recited in claim 1 wherein said retaining means comprises first and second L-shaped locking levers pivotally mounted at the heel portion thereof to said wiring card file at the ends of said wiring card array, and rotatable in a vertical plane about said mounting, first and second tie straps pivotally mounted at one end to the toe portions of said locking levers, and engaging said locking bar at the other ends thereof whereby rotation of said locking levers about their pivotal mountings in one direction drives said locking bar inwardly in compression against said printed wiring cards and rotation in the opposite direction drives said locking bar outwardly and relieves said compression.

4. Apparatus as recited in claim 3 wherein said tie straps are in free floating engagement with said locking bar.

5. Apparatus as recited in claim 3 further including a stop pivotally mounted to each said tie strap intermediate said locking bar and said locking lever such as to engage said locking lever and retain said locking bar in a withdrawn position outward from and above said printed wiring card array.

* * * * *